US008200708B2

(12) United States Patent
Ghosh et al.

(10) Patent No.: US 8,200,708 B2
(45) Date of Patent: Jun. 12, 2012

(54) IDENTITY DATABASE BUREAU

(75) Inventors: Debashis Ghosh, Charlotte, NC (US); Michael O'Hagan, Charlotte, NC (US); David Joa, Pacifica, CA (US); Kurt D. Newman, Matthews, SC (US); Thayer Allison, Charlotte, NC (US); Sudeshna Banerjee, Waxhaw, NC (US); Mark V. Krein, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 364 days.

(21) Appl. No.: 12/344,858

(22) Filed: Dec. 29, 2008

(65) Prior Publication Data

US 2010/0169386 A1 Jul. 1, 2010

(51) Int. Cl.
*G06F 7/00* (2006.01)
*G06F 17/30* (2006.01)

(52) U.S. Cl. ........................................................ 707/802

(58) Field of Classification Search ........................ None
See application file for complete search history.

(56) References Cited

U.S. PATENT DOCUMENTS

| | | | | |
|---|---|---|---|---|
| 6,187,540 | B1 * | 2/2001 | Staub et al. | 435/5 |
| 7,421,399 | B2 * | 9/2008 | Kimmel | 705/3 |
| 2001/0018660 | A1 * | 8/2001 | Sehr | 705/5 |
| 2001/0048756 | A1 * | 12/2001 | Staub et al. | 382/129 |
| 2005/0218215 | A1 * | 10/2005 | Lauden | 235/380 |
| 2006/0020459 | A1 * | 1/2006 | Carter et al. | 704/246 |
| 2006/0062591 | A1 * | 3/2006 | Oda | 399/107 |
| 2006/0206724 | A1 * | 9/2006 | Schaufele et al. | 713/186 |
| 2007/0036395 | A1 | 2/2007 | Okun | |
| 2007/0078908 | A1 * | 4/2007 | Rohatgi et al. | 707/203 |
| 2007/0266439 | A1 | 11/2007 | Kraft | |
| 2008/0095409 | A1 | 4/2008 | McQuaide | |
| 2008/0127318 | A1 | 5/2008 | Adler | |
| 2011/0175704 | A1 * | 7/2011 | Tesini et al. | 340/5.83 |

FOREIGN PATENT DOCUMENTS

WO WO2006062591 A1 6/2006

OTHER PUBLICATIONS

European Search Report for Application EP09252773.8.
http://www.thechildproject.org/intro.html retrieved on Aug. 27, 2009.
http://www.ukba.homeoffice.gov.uk/managingborders/technology/iris retrieved on Aug. 27, 2009.

(Continued)

*Primary Examiner* — Kuen Lu
*Assistant Examiner* — Tuan A Pham
(74) *Attorney, Agent, or Firm* — Weiss & Arons LLP; Michael Springs

(57) ABSTRACT

Systems and methods for making biometric data susceptible to use in locating individuals and tracking the location of individuals over time are provided. The system may involve the collection of initial biometric data, including iris scans, and corresponding identification information, the entry of such data into a database, and then the further collection of biometric data associated with locational information and entry of that data into a database correlating to the first database.

6 Claims, 2 Drawing Sheets

OTHER PUBLICATIONS http://www.cl.cam.ac.uk/~jgd1000/deployments.html retrieved on Aug. 27, 2009.

http://findarticles.com/p/articles/mi_pwwi/is_200203/ai_mark-09039866 retrieved on Aug. 27, 2009.

http://www.l1id.com/pages/17 retrieved on Aug. 27, 2009.

http://www.cl.cam.ac.uk/~jgd1000/csvt.pdf retrieved on Aug. 27, 2009.

http://www.cl.cam.ac.uk/~jgd1000 retrieved on Aug. 27, 2009.

http://bi2technologies.com retrieved on Jul. 10, 2009.

* cited by examiner

IDENTITY DATABASE BUREAU

FIELD OF TECHNOLOGY

Aspects of the disclosure relate to biometrics and databases.

BACKGROUND

Biometrics are methods for uniquely recognizing humans based upon one or more intrinsic physical or behavioral traits.

Biometrics, to be useful, must be unique, universal, acceptable, and readily collectible. Biometrics should be readily recognized, authentication should be timely performable, and circumvention should be difficult.

Permanence may also be a key feature of biometrics, such that the unique quality of any given biometric should remain essentially unchanged throughout the life of the individual.

Fingerprints, for instance, are considered an example of a biometric, as are retinal scans.

For the purposes of this application, any set of biometrics belonging to a specific individual is termed a Biometric Data Set (BDS).

For instance, the fingerprints of one particular person are part of that person's BDS, and the retinal scan of that same person is part of that person's BDS.

More recently, iris recognition (IR) has emerged as a prevalent method of biometric authentication.

IR uses pattern recognition techniques based on high-resolution images of the irides of an individual's eyes.

IR uses camera technology, with subtle infrared illumination reducing specular reflection from the convex cornea, to create images of the detail-rich, intricate structures of the iris.

Converted into digital templates, these images provide mathematical representations of the iris that yield unambiguous positive identification of an individual.

IR efficacy is rarely impeded by glasses or contact lenses, and apparently has the smallest outlier group of currently prominent biometric technologies.

Biometrics, and particularly IR technology, are a factor in the potential solution to two significant security problems plaguing the world today.

The first problem is that of identity theft. Identity theft is a significant and growing problem, imposing costs on its victims, law enforcement, and society as a whole.

The second problem is that of establishing a person's location, and particularly establishing a person's location over time.

There are many situations in which it is beneficial to businesses, governments, law enforcement or other entities to establish a person's location.

Establishing a person's location may be useful for finding lost persons, or for locating criminals or terrorists.

Moreover, both of those purposes are served well where a person's location can be identified over time.

Under conventional biometric identification programs, biometric data is collected and stored in databases associating the biometric with an individual.

Conventionally, however, information about the circumstances surrounding the collection of the biometric data may be difficult to obtain.

Conventionally, then, using biometric data to identify a person's location over time may be impracticable.

It would be desirable, therefore, to provide a method or system for making biometric data susceptible to use in locating individuals and tracking the location of individuals over time.

It would be further desirable to provide a method or system for providing identification based at least in part on biometric data wherein an individual and/or entity could opt-in to the method or system in exchange for heightened security consideration and/or other suitable benefits.

SUMMARY OF THE INVENTION

It is an object of this invention to provide methods or systems for making biometric data susceptible to use in locating individuals and tracking the location of individuals over time.

It is a further object of this invention to provide methods or systems for providing identification based at least in part on biometric data wherein an individual and/or entity could opt-in to the method or system in exchange for heightened security consideration and/or other suitable benefits.

The methods and systems may encompass one or both of two general steps. First, elements of a BDS are initially collected and an association with a particular individual is established. Second, elements of a BDS are collected along with locational information about the collection, and that information is associated with the individual.

For purposes of this application, "locational" information may be information concerning the location of an event in time or space (or both). Locational information may include information about the date of an event, the time of an event, and/or the physical location of an event to varying degrees of specificity.

The information so collected may then further be entered into one or more databases. Information in those databases may then be accessed in order to facilitate the location of an individual or the tracking of an individual over time.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
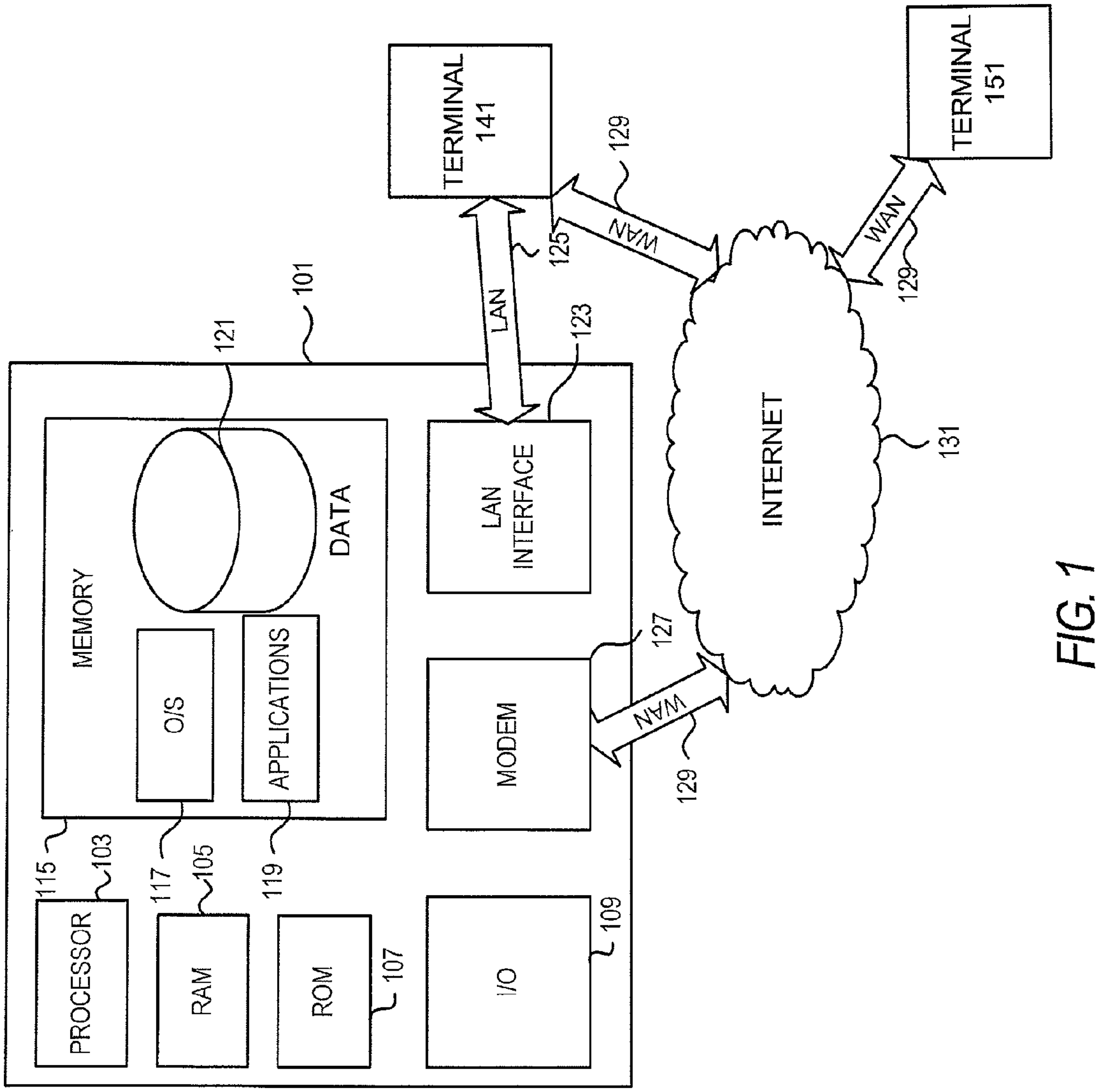
FIG. 1 is a block diagram that illustrates a generic computing device.

Methods or systems for making biometric data susceptible to use in locating individuals and tracking the location of individuals over time are provided.

As a first step, the elements of an individual's BDS are collected.

In some embodiments, this initial collection may occur as close to birth as is practical—e.g., within three (3) day of birth—or some other suitable period when the child is still under hospital care.

In some embodiments, the capture of an individual's BDS may be facilitated by other entities, such as bank branches, which might provide biometric capture devices as well as some type of identity confirmation or certification services. Such capture may be voluntary—i.e., on an opt-in basis—for individuals. Alternatively, such capture may be mandatory for individuals associated with selected entities. In yet other embodiments, such capture may be voluntary—i.e., on an opt-in basis—for certain entities.

It should be noted that, in return for voluntary capture of such information, an individual and/or an entity may be entitled to certain benefits such as heightened security consideration, which may manifest itself in express security check-in at public locations such as airports or train stations, or other suitable benefits.

The BDS is associated with identity information concerning that individual.

In some embodiments, the BDS may be so associated in an Identity Database (IDB) which may match the BDS to an individual's name and social security number or other pertinent information.

As a second step, an individual's biometric data may be captured at some physical location and point in time.

For instance, biometrics may be collected by law enforcement agencies, airport or border control agents, financial institutions, or merchants. Again, such collection may be implemented on a mandatory or a voluntary basis. Furthermore, the participation by institutions may be on an opt-in basis.

Biometrics may be collected passively, for instance by a passive iris scanner at a security checkpoint; biometrics may also be captured more actively, for instance by a law enforcement officer's taking of a person's fingerprints.

As mentioned above, biometrics may be collected with explicit consent. For instance, an individual may opt-in to have his biometric information stored in a database according to the invention. Alternatively, a merchant of particularly high-end goods may require a retina scan to confirm the identity of a buyer before accepting a credit card. In such a case, the buyer will also have agreed to the collection of biometrics. Such an agreement may extend to the buyer allowing his information to become part of a nationwide or other extended database.

Biometrics may be collected with only implicit consent. For instance, an entertainment venue may institute a passive iris scanning system to ensure the security and orderliness of its patrons.

Biometrics may, in some instances, be collected without consent. For instance, law enforcement may forcibly collect a suspect's or prisoner's fingerprints under certain legal circumstances.

For purposes of this application, captured biometrics and the associated locational information may be termed Biometric-Locational data (BLOC data).

BLOC data may then be associated with the BDS of a specific individual.

In some embodiments, that association may be accomplished by the inclusion of the BLOC data in a Location Information Database (LID).

BLOC data captured and sent to the LID that have no relevant entry in the IDB are stored separately, in what may be called the "orphan" database.

In some embodiments, BLOC data captured and sent to the LID that have no relevant entry in the IDB may force the creation of an entry in the IDB of a type as necessary to indicate that identity information is missing for that particular BDS.

Note that the initial collection of BDS for inclusion in the IDB will also have a locational aspect, and that collection may also serve as BLOC data for inclusion in the LID.

In some embodiments, on the capture of any new BDS (and entry of same into the IDB), the orphan database may be checked for BLOC data correlating to the new BDS. If a match is found, the orphan data may then be ported to the LID.

Systems and methods according to the invention may thus protect individuals from identity theft in a number of ways. One immediate benefit that may be obtained by an individual opting in to a database according to the invention may be that an individual's financial and personal transactions can be readily authenticated against that individual's BDS. As such, institutions that are adapted to access such a database according to the invention may preferably provide preferred and/or otherwise beneficial treatment to authenticated individuals.

At a more sophisticated level, the BLOC data available in the LID will make it possible for an entity such as a credit card company to recognize as suspicious transactions that are inconsistent with the BLOC data.

Law enforcement interests in protecting against terrorism and crime may be served by this invention as well.

For instance, law enforcement agencies may, within legal limits, access the LID to determine the historical locations and patterns of travel of an individual suspect of a crime or potential terrorist.

The purpose of assisting in finding lost or kidnapped persons may be served as well.

That purpose may be served by allowing law enforcement to track the location of an individual and to track the locations over time of other individuals nearby at the time of the person's disappearance or abduction.

That purpose may also be served in a more straightforward fashion, where passive collection of biometric data identifies the missing, lost, or abducted person.

Embodiments of the invention will now be described with reference to the figures.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, applications 119, and an associated database 121. Alternatively, some or all of server computer executable instructions may be embodied in hardware or firmware (not shown). As described in detail below, database 121 may provide storage for BDSs, IDBs, BLOCs, LIDs, and any other suitable information.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, applications 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Terminal 151 and/or terminal 141 may be portable devices such as a laptop, cell phone, blackberry, or any other suitable device for storing, transmitting and/or transporting relevant information.

BDSs, IDBs, BLOCs, LIDs, and any other suitable information may be stored in memory 115.

One or more of applications 119 may include one or more algorithms that may be used to perform the creation and manipulation of IDBs or LIDs, the evaluation of search queries put to IDBs or LIDs, and any other suitable tasks related to the creation, analysis, or processing of FTAMs.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
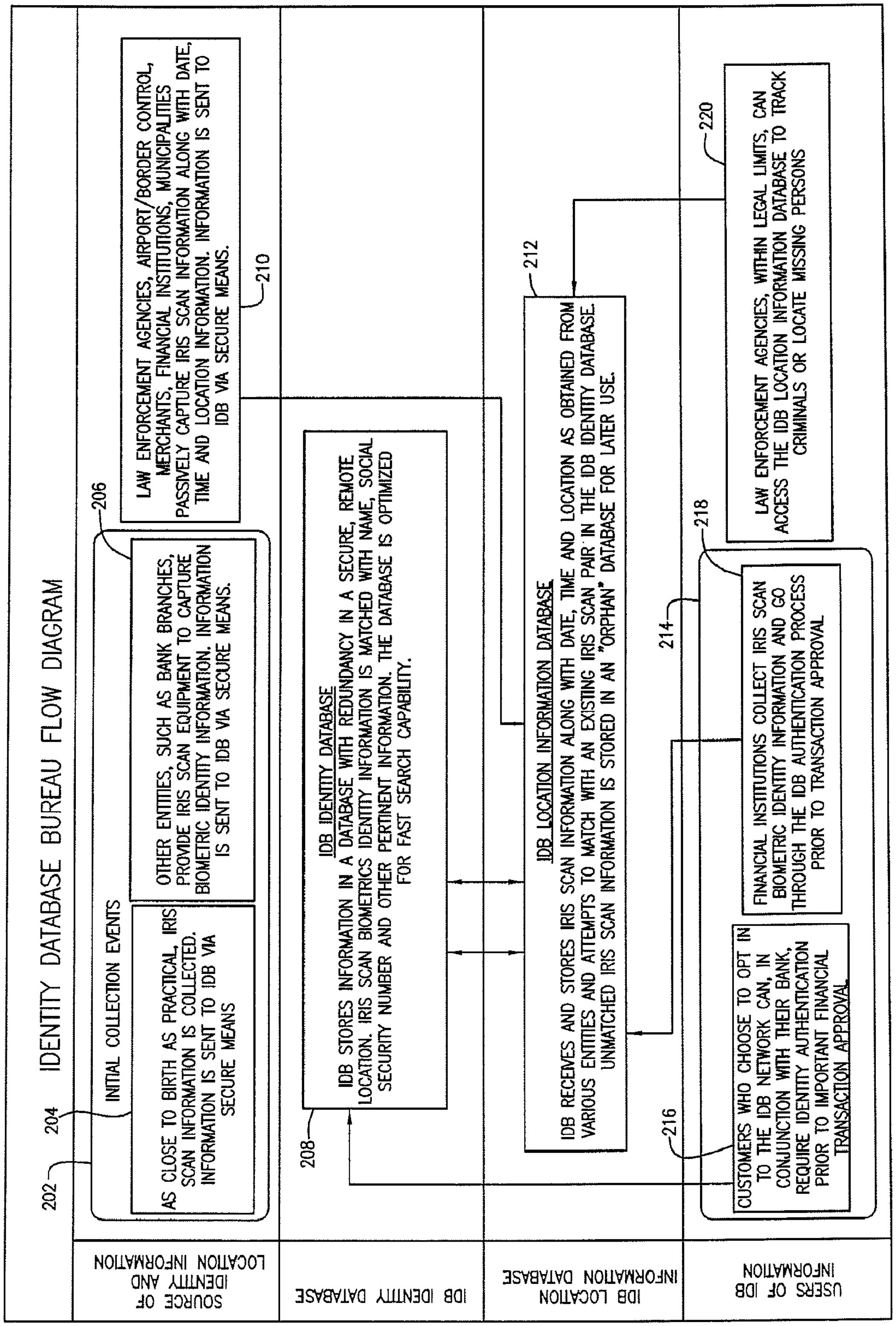
FIG. 2 shows a flow diagram of the collection and analysis of BDSs in accordance with the principles of the invention.

FIG. 2 is a flow diagram of the collection and analysis of BDSs in accordance with the principles of the invention.

Biometric data associated with a particular individual is collected at initial collection events 202, such as collection as close to birth as practical 204 or collection later in time.

Banks or financial institutions may provide biometric data capture 206 to customers who choose to opt-in in exchange for enhanced security or other benefits.

The biometric information gathered at the initial collection events may be stored in the IDB 208.

At other points in time, other agencies or institutions may passively capture 210 biometric information along with locational information.

That biometric information and the locational information may be stored in the LID 212.

In some instances, individuals already in the IDB may encounter transaction-based voluntary uses and collection events 214.

For instance, individuals who have opted-in with financial institutions may require biometric identification prior to certain financial transactions 216. At the time of such transactions the financial institution may collect biometric information 218, verify that information against the IDB 208, and also collect locational information and make an entry into the LID 212.

When an entity needs to track an individual's location, access is made to the LID 212. For instance, law enforcement agencies, within legal limits, can access the LID 212 to track criminals or locate missing persons 220.

Thus, systems or methods for making biometric data susceptible to use in locating individuals and tracking the location of individuals over time are provided. Persons skilled in the art will appreciate that the present invention can be practiced by other than the described embodiments, which are presented for purposes of illustration rather than of limitation, and that the present invention is limited only by the claims that follow.

What is claimed is:

1. One or more non-transitory computer-readable media storing computer-executable instructions which, when executed by a processor on a computer system, perform a method for providing an identity database bureau, the method using an electronic information processing platform, the method comprising:

receiving from a first financial institution initial biometric information related to an individual;

creating a first data file corresponding to the biometric information;

creating a second data file that includes locational data concerning the biometric data of the first file;

using the electronic information processing platform to provide an online electronic platform for subscription to a system configured to support the receiving and creating a first data file and creating a second data file, receiving additional biometric information related to an individual;

identifying the additional biometric information as duplicative of the initial biometric information;

modifying said second data file to include locational data corresponding to the collection of said duplicative information;

wherein:

by said subscription, the data of the first and second data files are accessible by a second financial institution;

the initial biometric information received is not accompanied by locational data such that said second data file is not created with the collection of the initial biometric information; and the modification of said second data set on the collection of said duplicative biometric information further comprises creating said second data file.

2. The medium of claim 1, wherein, in the method, the biometric information consists of at least one of iris scans, fingerprints, voiceprints, and retina scans.

3. The medium of claim 1, wherein, in the method, the receiving initial biometric information related to an individual further comprises obtaining biometric information from an individual within three days of the birth of that individual.

4. The medium of claim 1, wherein, in the method, the creating a first data file corresponding to the received initial biometric information further comprises:

verifying the identity of the individual from whom the biometric information is received; and associating that individual's identity with the initial biometric information.

5. One or more non-transitory computer-readable media storing computer-executable instructions which, when executed by a processor on a computer system, perform a method for providing an identity database bureau, the method using an electronic information processing platform, the method comprising:

receiving from a first financial institution initial biometric information without relation to an identified individual;

creating a first data file corresponding to the biometric information;

creating a second data file that includes locational data concerning the biometric data of the first file, if such exists;

using the electronic information processing platform to provide an online electronic platform for enrollment in a system configured to support the receiving and creating a first data file and creating a second data file, receiving additional biometric information and associated locational information;

identifying that biometric information as duplicative of data extant within the first data file; and creating or modifying said second data file to include locational data concerning the collection of said duplicative information;

verifying the identity of the individual from whom the biometric information is received; and associating that individual's identity with the biometric information so received in the first data file;

wherein:

by said enrollment, the data of the first and second data files are accessible by a second financial institution; and the receiving initial biometric information further comprises obtaining biometric information from an individual within three days of the birth of that individual.

6. The medium of claim 5, wherein, in the method, the biometric information consists of at least one of iris scans, fingerprints, voiceprints, and retina scans.

* * * * *